(12) United States Patent
Ali-Vehmas

(10) Patent No.: US 8,351,586 B2
(45) Date of Patent: Jan. 8, 2013

(54) METHOD AND APPLICATION FOR ARRANGING A CONFERENCE CALL IN A CELLULAR NETWORK AND A MOBILE TERMINAL OPERATING IN A CELLULAR NETWORK

(75) Inventor: Timo Ali-Vehmas, Kauniainen (FI)

(73) Assignee: Nokia Corporation, Espoo (FI)

( * ) Notice: Subject to any disclaimer, the term of this patent is extended or adjusted under 35 U.S.C. 154(b) by 113 days.

(21) Appl. No.: 10/590,466

(22) PCT Filed: Feb. 17, 2005

(86) PCT No.: PCT/FI2005/050036
§ 371 (c)(1),
(2), (4) Date: Aug. 23, 2006

(87) PCT Pub. No.: WO2005/083999
PCT Pub. Date: Sep. 9, 2005

(65) Prior Publication Data
US 2007/0173238 A1 Jul. 26, 2007

(30) Foreign Application Priority Data
Feb. 26, 2004 (FI) ...................................... 20040298

(51) Int. Cl.
*H04M 3/42* (2006.01)
(52) U.S. Cl. ......... 379/202.01; 379/204.01; 379/205.01; 455/416; 455/414.1; 455/566; 455/518; 455/466
(58) Field of Classification Search ............ 379/202.01, 379/204.01; 455/416, 414, 566, 518
See application file for complete search history.

(56) References Cited

U.S. PATENT DOCUMENTS

| 6,237,026 | B1 * | 5/2001 | Prasad et al. ................... 709/204 |
| 6,275,575 | B1 * | 8/2001 | Wu ........................... 379/202.01 |
| 6,505,040 | B1 * | 1/2003 | Kim ............................... 455/416 |
| 6,577,622 | B1 * | 6/2003 | Schuster et al. ............... 370/352 |
| 7,231,208 | B2 * | 6/2007 | Robertson et al. ............. 455/416 |
| 7,295,852 | B1 * | 11/2007 | Davis et al. .................... 455/518 |
| 7,403,793 | B2 * | 7/2008 | Mauney et al. ............ 455/552.1 |
| 2002/0009990 | A1 * | 1/2002 | Kleier et al. ................... 455/416 |
| 2002/0131565 | A1 * | 9/2002 | Scheuring et al. ......... 379/88.19 |
| 2003/0119540 | A1 | 6/2003 | Mathis .......................... 455/518 |
| 2004/0131167 | A1 * | 7/2004 | Chang et al. ............. 379/202.01 |
| 2004/0203977 | A1 * | 10/2004 | Kennedy ....................... 455/518 |
| 2005/0032475 | A1 * | 2/2005 | Mauney et al. .............. 455/41.2 |

FOREIGN PATENT DOCUMENTS
EP 1 322 131 A1 12/2001
(Continued)

*Primary Examiner* — Joseph J Nguyen
(74) *Attorney, Agent, or Firm* — Harrington & Smith

(57) ABSTRACT

The invention relates to a method for arranging a conference call with mobile terminals operating in a cellular network. At first, a group of the participants of the conference call is formed either by selecting the participants from a list saved in the memory of the mobile terminal in by inputting the contract information of the participants manually. In the next step, a summons to the conference call is drawn up in standard form. An application loaded into the memory of the convener's mobile terminal forms the summons, and sends the summons to the particulars via the cellular network. When a participant wants to join a conference call, he/she makes a call with the mobile terminal to the telephone number mentioned in the summons. An application in the mobile terminal of the convener receives the incoming calls and joins them to the conference call automatically.

34 Claims, 3 Drawing Sheets

FOREIGN PATENT DOCUMENTS

| | | |
|---|---|---|
| EP | 1 274 270 A1 | 1/2003 |
| GB | 2 376 608 A | 12/2002 |
| WO | WO 02/087204 A1 | 10/2002 |
| WO | WO 02/089408 A1 | 11/2002 |
| WO | WO 03/043301 A2 | 5/2003 |

* cited by examiner

METHOD AND APPLICATION FOR ARRANGING A CONFERENCE CALL IN A CELLULAR NETWORK AND A MOBILE TERMINAL OPERATING IN A CELLULAR NETWORK

TECHNICAL FIELD

The invention relates to a method for arranging a conference call between three or more participants using mobile terminals operating in a cellular network. The invention also relates to an application used in the method, a mobile terminal operating in a cellular network and a computer program for loading the application into the memory of the mobile terminal.

BACKGROUND

A cellular network provides the possibility of arranging a conference call connection between several callers. A conference call means a call set up between three or more participants, in which everyone can talk to all other participants and also hear the voice of all other participants. A conference call is a very useful characteristic by which it is possible to arrange telephone meetings, for example, quickly and easily. A conference call is started by first establishing a telephone connection between two participants. After this, one of the callers opens a new telephone connection to a third participant and joins this to the conference call. This process is repeated so many times that all participants have been joined in.

In practice, the method described above for establishing a conference call is very slow and cumbersome. In addition, it requires that the caller knows the properties of the telephone very well in order to open new telephone connections and to join them to the existing ones successfully. Many telephone users are not even aware of the possibility to use conference calls, because it is not in any way presented on a conventional telephone user interface. Because of the difficulties related to establishing a conference call, the use of these calls has been relatively rare, although in many communication situations it would be clearly the most expedient and efficient form of a telephone call.

SUMMARY

It is an objective of the invention to create a new method and application for arranging conference calls in a cellular telephone network. More particularly, it is an objective of the invention to create a method for arranging a conference call in a substantially simpler and faster way than with the prior art technique.

The objectives of the invention are achieved by a method and an application, which are characterized in what is set forth in the independent claims. Some preferred embodiments of the invention are presented in the dependent claims.

With the method according to the invention, a conference call is established between three or more participants. The participants use mobile terminals that operate in a cellular network, such as cellular telephones. The basic idea of the invention is that sending the summons to the meeting to the participants and joining the participants to the conference call takes place by means of an application loaded into the convener's mobile terminal. In the first step, a group is formed of the participants of the conference call by means of the application. This can be done either by selecting the participants from a list saved in the memory of the mobile terminal or by inputting the contact information of the participants to the application program manually. The contact information can be the telephone number of the participants or some other contact information, such as the e-mail address or SIP address, if the capabilities of the mobile terminals allow using them.

The summons to the meeting to be sent to the participants is formed in the next step. The application used in the method always draws up the summons to the meeting in standard form on the basis of the initial information given, whereby the matters that are essential with regard to the conference call are always found at the same points in the summons to the meeting. This enables picking up the desired information from the received summons to the meeting by means of an application in the mobile terminal. The complete summons to the meeting is sent to the mobile terminals of the participants via the cellular network. When a participant wants to join a conference call, he/she makes a call with the mobile terminal to the telephone number of the convener of the telephone meeting mentioned in the summons to the meeting. An application in the mobile terminal of the convener receives the incoming calls and joins them to the conference call automatically.

In a preferred embodiment of the invention, the group of participants is given a name and the group is saved in the memory of the mobile terminal for later use.

In another preferred embodiment of the invention, the time of the conference call and other information about the conference call, such as the agenda of the conference call, is given in the summons to the meeting.

In a third preferred embodiment of the invention, the summons to the meeting is formed as a character string consisting of American Standard Code for Information Interchange (ASCII) characters. The summons to the meeting is preferably sent to the participants as a text message or an e-mail message.

In a fourth preferred embodiment of the invention, in connection with forming and/or receiving the summons to the meeting, a connection to a calendar application in the terminal device is opened and a reservation of time is made in the calendar application.

In a fifth preferred embodiment of the invention, the summons to the meeting is saved in the memory of the mobile terminal for later use.

In a sixth preferred embodiment of the invention, the duration of the conference call and the name of the group of participants is saved in the memory of the terminal device.

The invention has the advantage that it makes it substantially faster and easier to arrange conference calls in cellular networks, such as GSM telephone networks.

In addition, the invention has the advantage that people who use mobile terminals operating in a cellular network become more aware of the existence of the conference call capability, which promotes using the mobile terminal in an efficient and expedient manner.

A further advantage of the invention is the fact that all the technical properties needed for implementing the invention already exist in all cellular networks, and therefore the invention can be implemented in a simple manner by an application installed in the mobile terminal.

BRIEF DESCRIPTION OF THE DRAWINGS

In the following, the invention will be described in more detail. Reference will be made to the accompanying drawings, in which.

DETAILED DESCRIPTION

Figure 1:
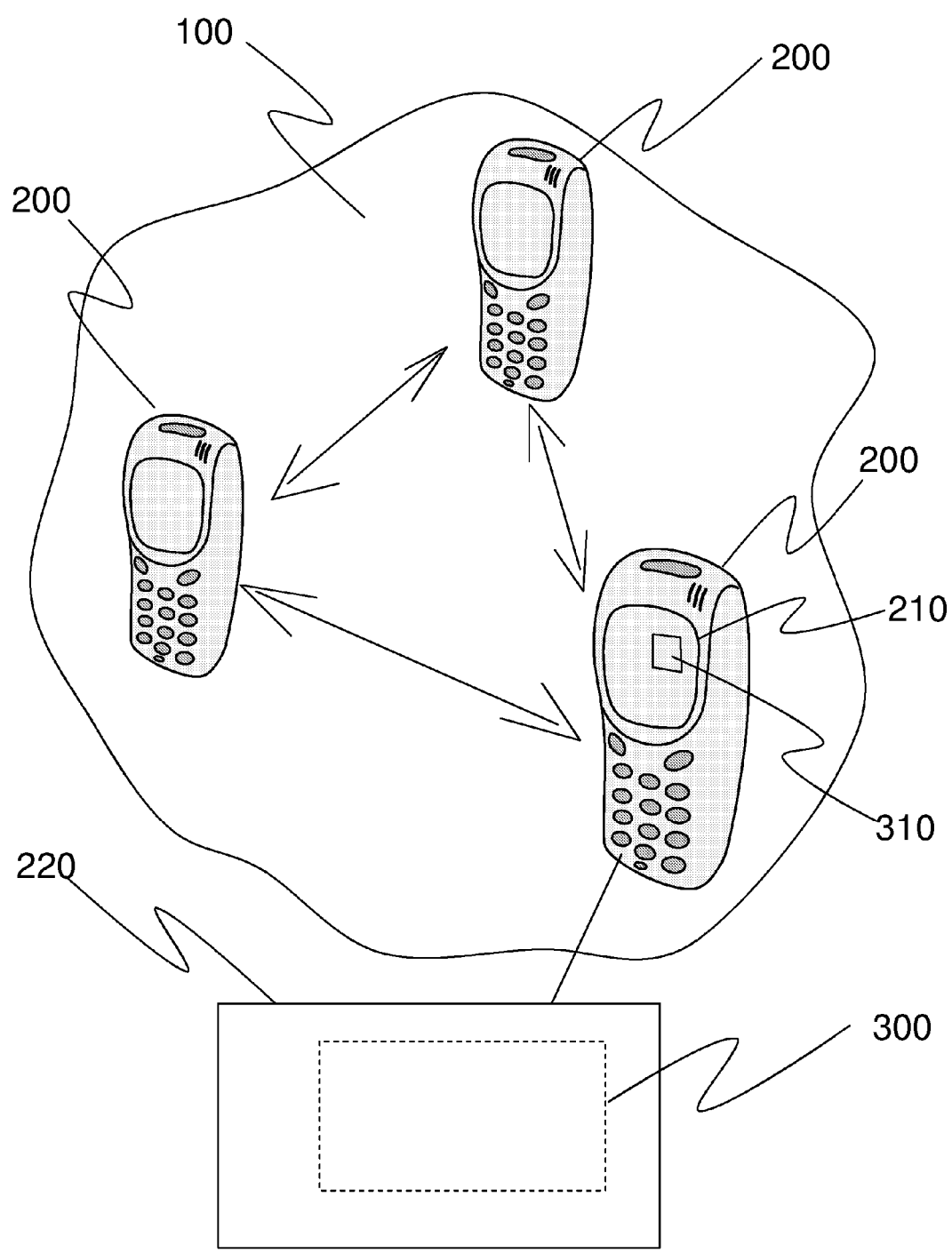
FIG. 1 shows a simple, exemplary diagram of the operating environment where the method according to the invention is used.

FIG. 1 shows an exemplary diagram of the operating environment where the method according to the invention is used. In the invention, a conference call is established between three or more mobile terminals 200 operating in a cellular network 100. In this presentation, a mobile terminal operating in a cellular network means a device by which telephone calls can be made and received via a cellular network. At the simplest, the mobile terminal is then a cellular telephone, such as a GSM telephone. The mobile terminal can also have other more advanced properties, such as the possibility to send and receive e-mail messages and the possibility to establish a connection to the Internet.

In the method according to the invention, an application 300, by which the conference call is established, has been loaded into the memory 220 of the convener's mobile terminal. The application has been written in such a programming language that it can be used as extensively as possible in different mobile terminals. Preferably, the programming language used in the application is JAVA or Symbian. When the user of the mobile terminal wants to convene a conference call, he/she starts the application in the mobile terminal through the menu functions of the mobile terminal. Preferably, there is also a starting icon 310 arranged in the application and brought to the display 210 by the application. Then the application can also be alternatively started with the starting icon.

Figure 2:
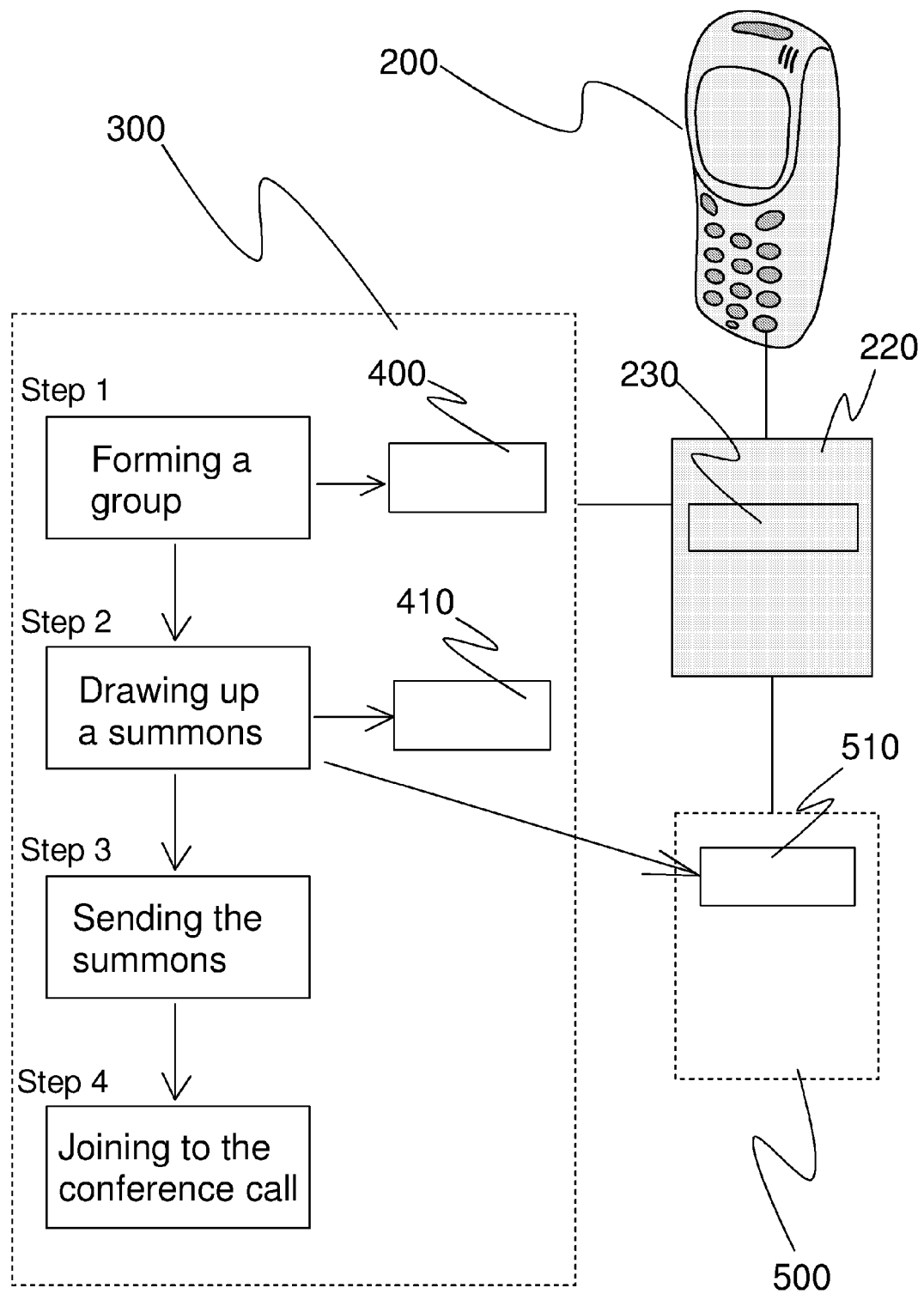
FIG. 2 shows an exemplary diagram of convening a conference call with the method according to the invention.

FIG. 2 shows an exemplary diagram of the steps performed with the convener's mobile terminal 200 when a conference call is established using a method and application according to the invention. In step 1, the convener of the conference call forms a group 400 of the participants of the conference call by means of an application loaded into the memory 220 of the mobile terminal. If the names and contact information of the participants, such as the telephone numbers, e-mail addresses or SIP addresses, have been saved in a separate list 230 in the memory 220 of the terminal device 200, forming the group takes place simply by picking up the names of the participants from the list one by one and adding them to the group. The application includes an operation by which the contact information of the participants can also be inputted to the program manually, if this information is not in the memory of the mobile terminal. In most cases the mobile terminals operating in a cellular network are cellular telephones, which makes it natural to use the telephone number of a cellular phone as the contact information of the participants. If the mobile terminals of the participants and the convener of the conference call are capable of sending and receiving e-mail messages, the participant's e-mail address can also be used as contact information instead of the telephone number. The summonses to the meeting can also be transmitted to the participants via the Internet, if the mobile terminals have Internet capabilities. In that case, the participant's SIP address (Session Initiation Protocol) can be used as contact information. The formed group can be given a name and it can be saved in the memory 220 of the mobile terminal 200 for possible later use.

When the group of participants 400 has been formed, the process moves to step 2, in which a summons to the meeting 410 to be sent to all participants is formed. The application according to the invention includes an operation which forms the summons to the meeting automatically by means of the initial information given. If the convener does not give any initial information, the summons to the meeting only includes a notice of having a conference call and the telephone number of the convener of the conference call. It is advantageous to give at least the time of starting the conference call in the form of date and time as the initial information. When desired, the subject or agenda of the conference call can also be included in the initial information. The application 300 according to the invention forms the summons to the meeting as a character string composed of ASCII characters, which can be sent to the recipients as a text message or an e-mail message. The summons to the meeting is always made in standard form so that a similar application in the mobile terminal of the recipient of the summons can easily pick up the essential information, such as the starting time of the conference call, from the summons to the meeting. However, receiving the summons to the meeting does not necessarily require that the recipient's mobile terminal has the application, because the summons to the meeting in text form is readable and understandable as such. The summons to the meeting can be saved in the memory of the mobile terminal, in which case it can be edited and used again later as updated.

Steps 1 and 2 of the method according to the invention described above can also be carried out in a different order, i.e. the convener of the conference call can draw up the summons to the meeting first and then form a group of the participants of the conference call.

In step 3, the summons to the meeting is sent to all members of the group of participants 400. The summons to the meeting is transmitted from the mobile terminal 200 of the convener of the conference call via the cellular network 100 to the mobile stations of the participants who belong to the group, whereafter they can be read by the participants.

When a participant wants to join the conference call, he/she simply makes a call with the mobile terminal to the telephone number given in the summons to the meeting 410. In step 4, the convener of the conference call receives the calls coming to his/her mobile terminal and joins them to the conference call. This is repeated so many times that all participants have been joined to the conference call.

Step 4 can also be carried out automatically with the application according to the invention. The application 300 also includes an optionally activatable monitoring function for monitoring the caller information of calls arriving in the mobile terminal 200. If an arriving call comes from a mobile terminal that received a summons 410 to the meeting, the application receives the call automatically and joins it automatically to the conference call. The monitoring of arriving calls and automatic reception and joining of calls to the conference call are characteristics of the application that can be switched on or off according to the preferences of the user of the mobile terminal 200 manually through the menu functions of the mobile terminal. Switching a function on can also be implemented by calendar control, whereby the function is switched on automatically when the time of the beginning of the conference call comes closer. The application can also include a prevention function that prevents the reception of calls coming from other mobile terminals than those of the participants of the conference call when the monitoring operation is activated.

Preferably, the application according to the invention includes a notification function that notifies the user of the mobile terminal every time a new participant has joined the conference call. The notification can be given with a simple acoustic signal or advantageously with a recorded voice message. A corresponding notification informing the user of the mobile terminal is preferably also given when all participants have been joined to the conference call.

Preferably, the application according to the invention includes a function by which the application can establish a connection to a calendar application 500 loaded into the memory 220 of the mobile terminal 200. Due to this facility, when drawing up the summons to the meeting, the convener of the conference call can select a suitable free time for the conference call by using the calendar program. The connection between the application according to the invention and the calendar application is preferably implemented so that at the same time as the time for the conference call is recorded in the summons to the meeting, a reservation of time is also recorded in the calendar program of the mobile terminal.

In a preferred embodiment of the invention, information concerning the conference call is saved by means of the functions of the application in the memory 220 of the mobile terminal after the conference call has ended. Saving the duration of the call in the memory of a mobile terminal is a feature known as such, which has been used in cellular phones for a long time. However, this invention has such an additional feature that in addition to the duration of the call, it is also possible to save other information about the conference call, such as the names of the participants, the name given to the conference call or the name of the group of participants. Due to this extra information, information concerning the conference call can be easily found in the memory of the mobile terminal.

Reception of a summons to a meeting is possible with all such mobile terminals of a cellular network, which have means for reading a character string composed of ASCII characters. The receiving terminal can thus be, for example, an ordinary mobile phone operating in a cellular network. If an application according to the invention has been installed in the mobile terminal receiving the summons to the meeting, part of the routines associated with a conference call can be handled by the application.

Figure 3:
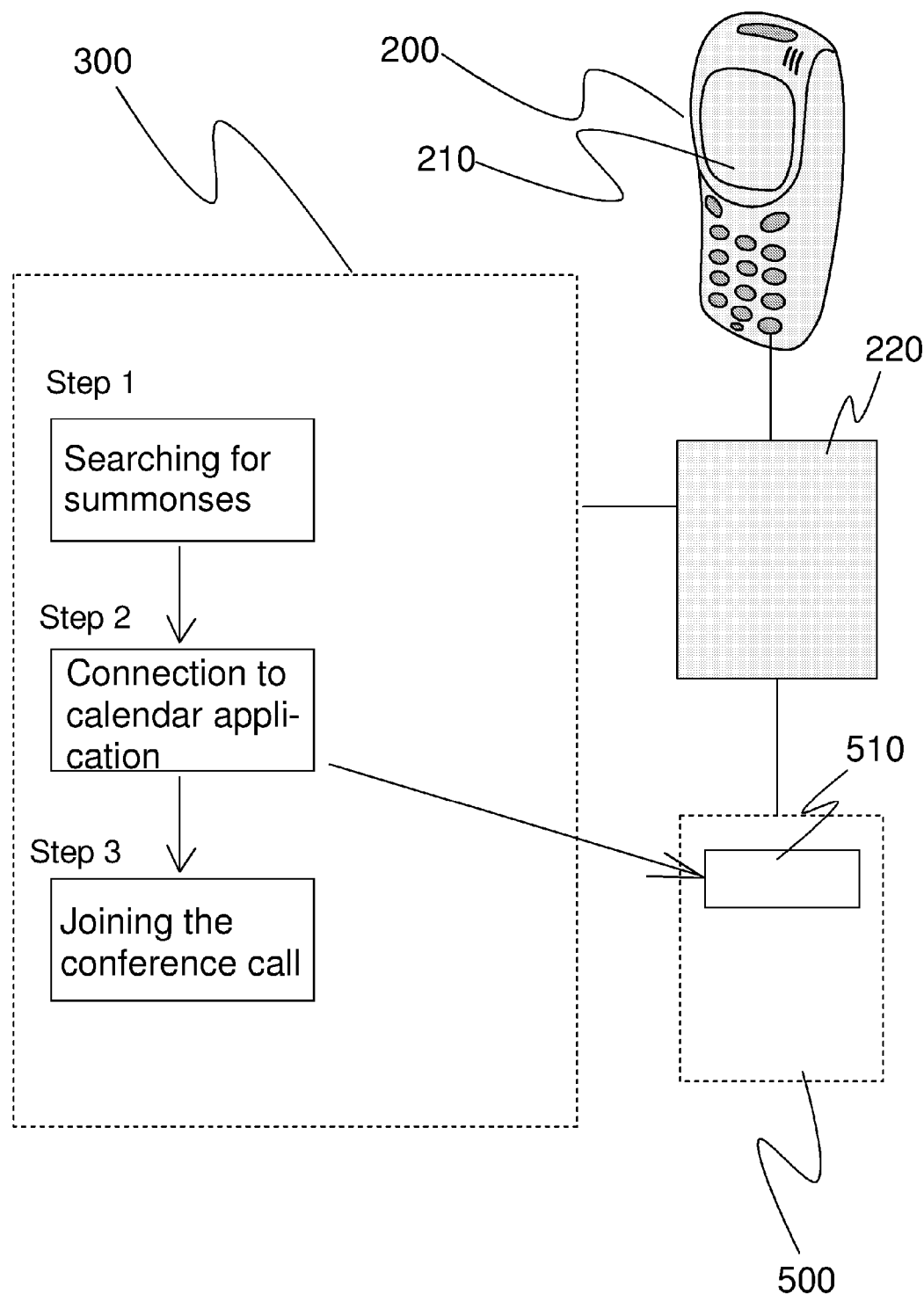
FIG. 3 shows an exemplary diagram of replying to the summons to the meeting and joining the conference call with the method according to the invention.

FIG. 3 is a step-by-step diagram of replying to a summons to a meeting 410 and joining a conference call, when the mobile terminal 200 of the recipient of a summons to a meeting has an application 300 according to the invention. The application according to the invention has a function which can filter arriving messages and separate summonses to meetings from other messages received by the terminal. The separation is based on the fact that the summonses to meetings have been drawn up in easily recognizable standard form by the application. In step 1, the application searches for summonses 410 from among the arriving messages and opens a found summons automatically on the display 210 of the terminal 200. Having read the opened summons to a conference call, the participant can then quickly confirm participation with a return message.

The characteristic of the invention described above for establishing a connection to a calendar application in the mobile terminal is also available in the step when the conference call message is received. In step 2, the user establishes a connection to the calendar application 500 of the mobile terminal 200 with the application and checks if the suggested time for a conference call suits him/her. If the suggested time for a conference call is free, the user can record a reservation of time 510 in the calendar application of the terminal. After this, the participant can send the convener of the conference call confirmation of participating in the conference call.

In step 3, the participant joins the conference call. This takes place so that the participant calls with his/her mobile terminal the telephone number of the convener of the conference call. In the method according to the invention, this telephone number is picked up automatically from the summons message by means of the application 300. Picking up the number of the sender from a text message is a function used in cellular telephones and known as such. However, in this invention it is also possible, due to a special function arranged in the application, to pick up the telephone number and call the number picked up automatically when the summons to the meeting has arrived in the recipient's terminal as an e-mail message.

All participants of the conference call who have an application according to the invention in their mobile terminals have the possibility to record the duration of the conference call and other information about the conference call in the memory of the mobile terminal. Due to the additional information, information concerning the conference call can be easily found.

Embodiments of the invention also include a storage medium storing a computer program for loading an application into a memory of a mobile terminal of a convener of a conference call, the application being for establishing the conference call between three or more participants comprising a group of participants of the conference call, where execution of the computer program results in operations that comprise, in the mobile terminal: drawing up the summons to the meeting in standardized form, sending the summons to the meeting from the mobile terminal to all members of the group of participants, and in response to receiving a call from a participant, joining the participant to the conference call automatically.

Some preferred embodiments of the method and application according to the invention have been described above. The invention is not limited to the above described solutions only, but the inventive idea can be applied in many ways within the scope defined by the claims.

The invention claimed is:

1. A method comprising:
   drawing up a summons to a meeting in a mobile terminal of a convener of a conference call between three or more participants that form a group of participants using respective mobile terminals operating in a wireless network, to arrange a conference call, wherein the summons to the meeting includes the telephone number of said convener;
   sending, by the mobile terminal of the convener, the summons to the meeting from the mobile terminal of the convener to all members of the group of participants;
   receiving calls, at the mobile terminal of the convener from two or more of the participants, the respective participants having made the call to the telephone number mentioned in the summons; and
   automatically joining the participants to the conference call in the mobile terminal of the convener.

2. A method according to claim 1, wherein the summons to the meeting is drawn up before the group of participants is formed.

3. A method according to claim 2, wherein a duration of the conference call and a name of the group of participants are saved in a memory of the mobile terminal.

4. A method according to claim 1, wherein the group of participants is formed by selecting the participants from a list saved in a memory of the mobile terminal and/or by manually inputting the contact information of the participants and wherein the contact information comprises at least one of the following:

telephone numbers, e-mail addresses, and Session Initiation Protocol addresses.

5. A method according to claim 1, wherein the group of participants is given a name and the group is saved in a memory of the mobile terminal of the convener for later use.

6. A method according to claim 1, wherein a time of the conference call and other information concerning the conference call is given in the summons to the meeting.

7. A method according to claim 6, wherein an agenda of the conference call is given in the summons to the meeting.

8. A method according to claim 1, wherein the summons to the meeting is formed as a character string composed of American Standard Code for Information Interchange characters.

9. A method according to claim 8, wherein the summons to the meeting is sent to all members of the group of participants as a text message.

10. A method according to claim 8, wherein the summons to the meeting is sent to all members of the group of participants as an e-mail message.

11. A method according to claim 1, wherein, in connection with drawing up the summons to the meeting, a connection is opened to a calendar application in the mobile terminal of the convener and a reservation of time is made in the calendar application.

12. A method according to claim 1, wherein the summons to the meeting is saved in a memory of the mobile terminal for later use.

13. A method according to claim 1, wherein the convener of the conference call is given a notification by the mobile terminal of the convener when a new participant has been joined to the conference call.

14. A method according to claim 13, wherein the notification comprises an acoustic signal or a recorded voice message.

15. A method according to claim 1, wherein the summons to the meeting is drawn up in such a way that the information regarding the conference call is found at the same points in the summons.

16. A non-transitory memory comprising
computer program code tangibly embodied thereon, wherein the memory is configured to store an application for a mobile terminal of a wireless network to establish a conference call between three or more participants that form a group of participants of the conference call by actions comprising:
drawing up a summons to a meeting, wherein the summons to the meeting includes the telephone number of said convener;
sending the summons to the meeting to members of the group of participants;
receiving calls coming from two or more of the participants, the respective participants having made the call to the telephone number mentioned in the summons; and
automatically joining the participants to the conference call, wherein the memory is included in the mobile terminal.

17. The memory according to claim 16, wherein the actions comprise:
forming the group of participants of the conference call by selecting participants from a list saved in the memory of the mobile terminal.

18. The memory according to claim 16, wherein the actions further comprise starting the application using a starting icon produced on a display of the mobile terminal.

19. The memory according to claim 16, wherein the actions further comprise starting the application from a menu of the mobile terminal.

20. The memory according to claim 16, wherein the summons to the meeting is formed as a character string composed of American Standard Code for Information Interchange characters.

21. The memory according to claim 20, wherein the summons to the meeting is formed as a text message.

22. The memory according to claim 20, wherein the summons to the meeting is formed as an e-mail message.

23. The memory according to claim 16, the actions further comprising creating a connection to a calendar application in the mobile terminal for making a reservation of time in the calendar application.

24. The memory according to claim 16, the actions further comprising separating the received summons to the meeting from other messages that have arrived.

25. The memory according to claim 16, the actions further comprising picking up a telephone number from the received summons to the meeting and automatically making a call to the number picked up.

26. The memory according to claim 16, the actions further comprising saving a duration of the conference call and a name of the conference call in the memory of the mobile terminal.

27. The memory according to claim 16, the actions further comprising giving a notification to a convener of the conference call when a new participant has been joined to the conference call.

28. The memory according to claim 16, wherein the actions comprise forming the group of participants of the conference call by inputting contact information of the participants to the application program manually, the contact information comprising at least one of telephone numbers, e-mail addresses, and Session Initiation Protocol addresses.

29. A mobile terminal comprising a display and memory and an arrangement configured to arrange a wireless conference call between three or more participants that form a group of participants of the conference call, further comprising an application loaded into the memory of the mobile terminal, which causes the mobile terminal to:
draw up a summons to a meeting by including the telephone number of the convener;
send the summons to the meeting to members of the group of participants;
receive calls coming from two or more of the participants, the respective participants having made the call to the telephone number mentioned in the summons; and
automatically join the participants to the conference call.

30. A mobile terminal according to claim 29, further comprising a starter configured to start the application using a starting icon brought to the display of the mobile terminal.

31. A mobile terminal according to claim 29, further comprising a starter configured to start the application from a menu of the mobile terminal.

32. A non-transitory storage medium configured to tangibly store thereon a computer program configured to load an application into a memory of a mobile terminal of a convener of a conference call, the application configured to establish the conference call between three or more participants comprising a group of participants of the conference call, where execution of the computer program results in operations that comprise, in the mobile terminal:

drawing up the summons to the meeting wherein the summons to the meeting includes the telephone number of the convener;

sending the summons to the meeting from the mobile terminal to all members of the group of participants; and receiving calls from two or more of the participants, the respective participants having made the call to the telephone number mentioned in the summons; and automatically joining the participants to the conference call.

33. A method comprising:

arranging a conference call between three or more participants that form a group of participants using respective mobile terminals operating in a wireless network, in which method a mobile terminal of a convener of the conference call performs:

drawing up a summons to a meeting wherein the summons to the meeting includes the telephone number of the convener;

sending the summons to the meeting from the mobile terminal of the convener to all members of the group of participants; and receiving calls from two or more of the participants in the mobile terminal, the respective participants having made the call to the telephone number mentioned in the summons; and automatically joining the participants to the conference call.

34. An apparatus comprising:

a processor, and memory including computer program code, the memory and the computer program code configured to, with the processor, cause the apparatus to:

draw up, at a mobile terminal, a summons to a meeting to arrange a conference call between three or more participants that form a group of participants, wherein the summons to the meeting includes the telephone number of the convener;

send the summons to the meeting from the apparatus, via the mobile terminal, to all members of the group of participants; and receive calls, at the mobile terminal, from two or more of the participants, the respective participants having made the call to the telephone number mentioned in the summons; and automatically join the participants to the conference call in the mobile terminal.

\* \* \* \* \*